3,236,736
AUGMENTING AVIAN BLOOD LEVELS OF
5-OXYTETRACYCLINE
Steven J. Fitch, Creve Coeur, and Riyad Rida Irani, St. Louis, Mo., assignors to Monsanto Company, St. Louis, Mo., a corporation of Delaware
No Drawing. Filed Mar. 15, 1965, Ser. No. 439,981
4 Claims. (Cl. 167—53.1)

This application is a continuation-in-part of application Serial No. 218,554, filed August 22, 1962, now abandoned.

This invention relates to tetracyclic antibiotics and to procedures for using them effectively. More specifically, the invention is directed to the use of antibiotics in the control of bacteria and other pathogenic organisms in the bodies of higher animals, particularly birds and mammals. More specifically, the invention relates to animal feeds containing antibiotics in effective formulations.

When a living organism ingests an antibotic, and especially tetracycline, 5-oxytetracycline or 7-chlorotetracycline, it enters the body fluids and becomes active in the control of parasitic bacteria, viruses, and other pathogens present in the said fluid. Often the control of these organisms depends upon a substantial concentration of the antibiotic in the body fluid, especially in the blood. The effective concentration can be attained by increasing the quantity charged to the feed, but this procedure is often not desirable because of the cost of the tetracycline antibiotic and because of the inefficient utilization of the additional amount. By analytical procedures the concentration in the blood can be determined and this is a measure of the degree of protection which the host animal is receiving from the antibiotic. If the animal is seriously infected the use of the antibiotics may manifest a growth response or an improvement in feed efficiency.

The availability of the tetracycline antibiotics and the concentration in the blood may under certain conditions be influenced by other food components. Soluble calcium compounds inhibit the assimilation of the antibiotics and it is desirable to keep them at a minimum by either reducing the calcium content or by substituting very insoluble compounds, such as calcium sulfate, for the more soluble calcium compounds, calcium carbonate and limestone, usually used. The inhibiting effect of calcium can also be minimized by the addition of sodium salts of acids which form very insoluble calcium salts, for example of phosphoric acid, such as sodium phosphate ($N_3PO_4$), dibasic sodium phosphate ($Na_2HPO_4$) and dihydric phosphate ($NaH_2PO_4$).

By "antibiotic" is intended to include antipathogenic compounds which are administered through the digestive system of animals and enter the bloodstream to combat pathogenic organisms and other parasites found therein.

The phrase "tetracycline antibiotics" as used in this specification and the appended claims is intended to have a subgeneric significance and includes a variety of comounds which have antimicrobial activity and have similar structures to which have been assigned the generic name "tetracycline" by the Chemical Abstracts Nomenclature System (S.A.C.S. 74, 4976). Many of the tetracycline antibiotics are produced by culturing certain fungi and separating the bacterial active compounds produced by the fungi. Other "tetracycline antibiotics" are synthesized by the chemical modification of naturally produced tetracycline antibiotics.

The tetracycline antibiotics will have the basic structure

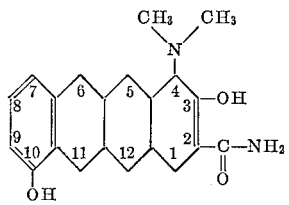

(1)

with substitutents which may vary in position and kind.

The accepted nomenclature regards the tetracycline (Achromycin) as being:

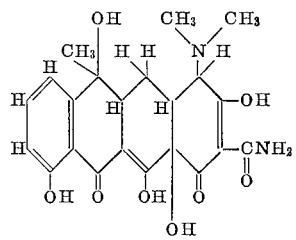

(2)

The substituted tetracyclines include:

Substituent—           Amine name
    5-OH _____ (Terramycin) 5-oxytetracycline.
    7-Cl _____ (Aureomycin) 7-chlorotetracycline.
    7-Br _____ 7-bromotetracycline.

Other homologues include:

6-deoxy-5-oxytetracycline
4-de(dimethylamino)-5-oxytetracycline
6-deoxytetracycline
6-deoxy-6-demethyltetracycline
6-methyl-7-chlorotetracycline
4-de(dimethylamino)tetracycline
4-de(dimethylamino)-7-chlorotetracycline
6-demethyltetracycline Other tetracyclines of the basic structure are:

4-dimethylamino-1,4,4a,5,7,8,9,10-decanhydro-3,11,12a-trihydroxy-6-methyl-1,10-dioxo-2-naphthacenecarboxamide
carboxamido-N-(isopropyl)-6-deoxy-7-chlorotetracycline
6-demethyl-12a-deoxyanhydrotetracycline
5a-epitetracycline
6-methylene-5-oxytetracycline
6-dimethyl-7-chlorotetracycline
7-bromo-6-dimethyl-6-deoxytetracycline
8,12a-dibromo-1,4,4a,5,12,12a-hexahydro-3,10,11-trihydroxy-6-methyl-1,12-dioxo-2-naphthacenecarboxamide.

Other compounds containing the basic configuration (1) and their water-soluble salts are also embraced by the term "tetracycline antibiotics." The use of all of these compounds in the control of parasitic bacteria and other pathogens, and especially in the body fluids is well known and not part of this invention. It is also known that the tetracycline antibiotics enter the bloodstream and that the concentration of the antibiotics in the blood is a measure of the ability of the animal to resist the deleterious effects of the bacteria. Furthermore, it is known that by increasing the quantity of the antibiotic introduced in the digestive tract, the concentration in the bloodstream can be increased.

It has been found that by the concurrent introduction of certain chemicals greatly increased antibiotic concentrations in the blood will occur. Although this phenomenon of antibiotic potentiation is known, the compounds used in this manner are not often greatly effective and frequently provide only minimal beneficial effects. The primary purpose of this invention is to provide compositions which, when fed to animals, will induce high levels of the tetracycline antibiotics in the bloodstream. A further purpose is to provide a procedure which will enable the animals to become more resistant to harmful bacteria and will provide for a more efficient use of the antibiotics.

It is known that aromatic polybasic acids will potentiate the antibiotic absorption in animals. Terephthalic acid has found wide experimental usage and is regarded as the standard potentiation which determines the activity necessary for commercial acceptance. In the experiments described hereinafter the potentiating effect is measured as a percentage of the effect of terephthalic acid or as a percent of improvement over terephthalic acid.

In accordance with this invention it has been found that a specific class of phosphonates will accomplish a potentiation of antibiotics whereby more effective benefits of the antibiotics are possible. These phosphonates have the structure

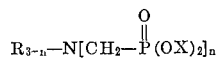

wherein n is an integer from one to three; wherein R is selected from the group consisting of hydrogen, alkyl radicals having up to 18 carbon atoms, chlorine substituted alkyl radicals having up to 18 carbon atoms, and hydroxyl substituted alkyl radicals of up to 12 carbon atoms; and wherein each X is selected from the class consisting of hydrogen, sodium, potassium, ammonium, and acyl radicals having up to 18 carbon atoms. Mixed salts, acids and esters can be prepared by varying X when a plurality of X groups is present. The ester groups may be acetate, propionate, butyrate, benzoate, laureate, caprylate, formate or any carboxylate having up to 12 carbon atoms.

Aminoethyl phosphonates suitable for the practice of the invention include the following:

Pentasodium aminotri(methyl phosphonate)
Tetraammonium aminodi(methyl phosphonate)
Diethyl aminomethyl phosphonate
Dipotassium N-hexylaminomethyl phosphonate
N-methyl tetramethyl aminodi(methyl phosphonate)
N-hexylamino(methyl phosphonic acid)
Tetraethyl N-oleylamino di(methyl phosphonate)
Aminotri(methyl phosphonic acid)
Pentasodium lauryl-amino(methyl phosphonate)
Sodium tetrapropyl aminodi(methyl phosphonate)
N-hydroxy ethoxyethyl disodium-amino(methyl phosphonate)
N-isobutyl tetraethyl aminodi(methyl phosphonate)
Sodium aminodi(phosphonic acid)

If one of these compounds is charged to an animal feed containing an antibiotic a substantially large proportion of the antibiotic will enter the bloodstream. It is conventional to formulate poultry and non-ruminant animals, for example lambs, swine, calves and horses, with antibiotics. The described compounds provide for a more efficient use of the antibiotic and will enable the use of less antibiotic or the improvement in the effect of the formerly used concentrations of antibiotics in animal feeds.

The feed compositions are formulated by conventional methods with the usual components and including from about 50 to about 500 grams per ton of feed of an antibiotic. The usage of about 150 to about 300 grams of the antibiotic per ton of feed will provide the deserved protection against parasitic organisms. The above-described amino-phosphonates may be used at levels of about 1–25 pounds per ton of feed but from about 5 to about 20 pounds will provide the desirable result for most formulations. Thus, on a weight basis, the compositions of the present invention contain between about one and about 250 parts of an amino-phosphonate for each part of antibiotic.

It has been also found that the use of surfactants will enhance the antibiotic potentiation. In formulations of this type, the surfactant may be added in substantially the same proportion as the principal antibiotic potentiator, for example, in general about 1 to about 25 pounds per ton of feed, and for optimum effects about 5 to about 20 pounds per ton of feed.

The surfactants which can be used in the practice of this invention may be any of a large number of compounds which have both hydrophobic and hydrophilic properties. A wide variation of molecular configurations and chemical properties are possible. These surface active compounds may have cationic or anionic properties or may be neither cationic nor anionic (nonionic). Some surface active agents may have both cationic and anionic functional configurations, which agents are known as ampholytic surfactants.

Several distinct types of anionic surfactants may be used, for example the straight chained naturally occurring fatty acids and their soaps. This type includes the fatty acids derived from animal and vegetable oils by the conventional saponification procedures, such as stearic acid, ricinoleic acid, margaric acid, lauric acid, myristic acid, palmitic acid, capric acid, caprylic acid, oleic acid, linoleic acid and linolenic acid, the alkali metal salts of these acids, particularly the sodium and potassium salts, the heavy metal soaps of these acids, such as the salts of metals such as lead, cobalt, manganese, Zn, nickel, aluminum, copper, iron and chromium, and the amino soaps, wherein the said acids are reacted with amines, for example as in triethylaminostearate, di-n-butylaminolaurate and anilinopalmitate.

Modified carboxylic acids of somewhat different properties may be made by substituting organic groups on the aliphatic chain, for example by oxidation which can take place on an unsaturated linkage to form a hydroxyl or epoxy group. Formic acid may be added to a double bond. By halogenation of the alpha carbon atom, hydroxylated alkyl substituents can be introduced. Halogenation on the unsaturated bonds provides a means of introducing side chains or functional groups. Other groups can be added directly to the double bond, for example formaldehyde will react with oleic acid to form a six member oxygen heterocyclic substituent. A variety of other mixed carboxylic acids can be prepared by saponification of wool, wax or by separation from tall oil. Other acids can be prepared from paraffins by oxidation to carboxy, keto and hydroxyl groups, accompanied by the formation of lower molecular weight compounds. These carboxylic acids may have intermediate groups such as ester, ether, sulfonyl. All of these modified carboxylic acids may be used as surface active agents or may be converted to salts of alkali or heavy metals, or to amine soaps.

Another group of anionic surfactants are the esters of sulfur acids, such as sodium lauryl sulfate, the various alkali metal alkylaryl sulfonates, for example sodium dodecylbenzene sulfonate, sodium-2-ethylhexylnaphthyl sulfonate and sodium octadecyl benzene sulfonate. These and other sulfuric acid esters can be prepared by first reducing the acids, for example by sodium or by hydrogenation followed by sulfonation. Oxo alcohols and other synthetic alcohols such as keryl alcohols, made by chlorination of kerosene, reacting with sodium benzoate and saponifying the resulting product; or the alcohol made by reaction of formaldehyde with triisocutylene may also be sulfated. Olefins or olefin polymers (polypropylenes and isobutylene polymers) may be sulfated directly. Ester alcohols and amido-alcohols will by sulfonation procedures provide valuable surfactants. Many alkane sulfonates, for example octadecyl sulfonate, those prepared by oxidation of long chain alkyl mercaptans, those prepared by direct reaction of paraffin oils with $SO_3$ or chlorosulfonic acid are valuable anionic surfactants. Petroleum sulfonates known as mahogany or green soaps, by-products from the petroleum refining industry, are useful.

Other types of anionic surfactants are the phosphorus compounds such as di(2-ethylhexyl)orthophosphate or the acid phosphate esters of coco-monoethanolamide; sulfinic acid made by reduction of sulfonyl chlorides, the sulfunamides, the hydrogenated aromatization or polymerization of tall oil rosin acids, the lignin sulfonate by-products from the sulfite paper industry and the lignin sulfonates modified by controlled alkaline hydrolysis. These anionic surfactants have a long chain oil soluble group and an ionizable acid or salt group to provide the antionic properties.

The useful surfactants for the practice of this invention also include many of the cationic types, for example, the fatty acid nitriles prepared by the reaction of ammonia and fatty acid under pressure at elevated temperatures; amines with or without intermediate ester; ether or amide linkages; the amino alcohols, allyl diamines; the alkyl anilines; the imidazolines made by condensing fatty acids with ethylene diamine; the quaternary nitrogen bases containing a long chain oil soluble group and an ionizable acid group, usually chloride or bromide, such as tetradecyl pyridinium chloride; N-alkyl morpholine, which may be quaternized, for example with butyl bromide; the reaction product of pyridine and 2-chloroethyl dimethyl dodecyl ammonium chloride; the reaction products of tertiary amines and chloromethyl stearamide, the thiouronium salts, such as the reaction product of chlorinated paraffin and urea; and the phosphonium salts, such as higher alkyl bis(dimethylamino)phosphonium halides.

Another and a very important type of surfactant, which can be used, is that having neither anionic or cationic properties. These are called nonionic surfactants and include esters, ethers, alcohols and phenols which do not have ionizable substituents. They must have an oil attractive long chain hydrocarbon group and a hydrophilic substituent which is nonionogenic. This type of surfactant includes polyhydroxy compounds such as the fatty acid esters of the polysaccharides, such as sucrose and dextrose; the fatty acid monoesters of glycols; esters of fatty acid monoglycerides and hydroxy acids, such as lactic or glycolic acids; and the glucose derivatives, for example the transesterification product of methyl glucoside and long chain fatty acid esters. The bulk of the nonionic surfactants are based on ethylene oxide or homologues thereof, wherein the hydrophilic properties are due to the presence of a plurality of ethoxy groups. Many of these are prepared by the condensation of a large excess of ethylene oxide on a nonionic hydrophobic phenol or alcohol, for example, dodecylphenol, but they also can be prepared by reacting a long chain fatty acid with a large excess of ethylene oxide which reacts with the ionogenic carboxy groups to form hydroxy ethyl esters, for example ethoxy(ethoxy)$_n$ stearate, and the ethylene oxide (9 mols) condensate with tetrapropylene benzene sulfonic acid. An increase in the number of mols of ethylene oxide increases the hydrophilic properties. The nonionic surfactants may have in the hydrocarbon structure nonhydrocabron groups such as tertiary amino nitrogen, sulfide, sulfone and ester groups. The intermediates for condensation with ethylene oxide have terminal groups such as hydroxyl, aldehyde, carboxyl, mercapto, sulfonic acid, sulfonamide, guanylurea, amino and amido. These will provide the necessary surface active properties.

One additional type of surfactants are the ampholytic compounds, possessing both cationic and anionic groups, for example N-dodecyl-N-phenyl-aminocarboxylic acids or salts, dimethyl-aminoethyl benzene sulfonic acid quaternized with an alkyl halide and the carboxylic acids containing an imidazoline molecular grouping.

Frequently the surface active agents may be improved or otherwise modified by the incorporation of additives known as builders such as pyrophosphates, tripolyphosphate, sodium silicates, clays, particularly the expanding lattice type silica gels, sodium zincate, colloidal aluminum hydroxide, ammonium carbonate, dicyandiamide and sodium ferrocyanide.

Other surfactants and methods for their preparation and use are described in detail in the textbook "Surface Active Agents and Detergents," Schwartz, Perry and Berch, Interscience Publishers Inc. (1958). The word "surfactants" is used to define the broad class, all of which appear to aid the absorption of the tetracycline antibiotics and transfer from the digestive system into the bloodstream.

The following surfactants are specific examples of superior commercially available surfactants:

Dodecylbenzene sodium sulfonate (85% active)
Dodecylbenzene sodium sulfonate (70% active)
Dodecylbenzene sodium sulfonate (40% active)
Mixed acids derived from tallow condensed with ethylene oxide
Alcohols from tallow acids condensed with ethylene oxide
Long chain mixed mercaptans condensed with ethylene oxide
Dodecyl phenol condensed with 6 mols of ethylene oxide
Nonyl phenol condensed with ethylene oxide
Long chain alcohols condensed with ethylene oxide (85% active)
n-Mixed alkyl, 8–18 carbon atoms, trimethyl ammonium chloride
1,3-propane diamine partially quaternized with halides derived from tallow oil and condensed with ethylene oxide

*Example 1*

Potentiation studies were conducted with 3 to 4 week old chicks maintained on an antibiotic free diet for at least one week. The tests were conducted by weighing each bird individually and feeding the birds with about 75 mg. per kg. of body weight of 5-oxytetracycline and varying proportions of pentasodium aminotri(methylphosphonate). After three hours, samples of blood were taken, centrifuged to obtain a clear serum and assayed to determine the concentration of 5-oxytetracycline. The following table sets forth the approximate dosage of pentasodium aminotri(methylphosphonate) and the concentration of Terramycin expressed in percentage of terephthalic acid.

| Compound | Dosage | Percent Effectiveness |
|---|---|---|
| n-Hexyl aminodi(methyl phosphonic acid) | 0 | 100 |
|  | 475 | 215 |
|  | 500 | 255 |
|  | 1,500 | 230 |
| Pentasodium aminotri(methyl phosphonate) | 0 | 100 |
|  | 150 | 300 |
|  | 475 | 360 |
|  | 1,500 | 260 |

*Example 2*

Two to four week old chicks were divided into groups of 15 birds each, the birds were weighed as a group and fed the experimental diets approximately as below:

| Ingredient | Diet A | Diet B | Diet C |
|---|---|---|---|
| Ground Yellow Corn | 60.2625 | 60.2625 | 60.2625 |
| 50% Soybean Oil Meal | 24.0 | 24.0 | 24.0 |
| Tallow | 2.5 | 2.5 | 2.5 |
| Fish Meal | 5.0 | 5.0 | 5.0 |
| Dehydrated Alfalfa Meal (17%) | 1.0 | 1.0 | 1.0 |
| Corn Gluten Meal (43%) | 2.0 | 2.0 | 2.0 |
| Vitamin Mix S-35 | 0.5 | 0.5 | 0.5 |
| Hydroxyanalogue of Methionine | 0.0375 | 0.0375 | 0.0375 |
| 5-Oxytetracycline | 0.2 | 0.2 | 0.2 |
| Solkafloc (cellulose filler) | 0.75 | 0.75 | 0.75 |
| Mineral Mixture | 3.75 | 3.75 | 3.75 |
| Pentasodium aminotri(methyl phosphonate) | 0.375 | 0.5 | 0.75 |

After one week on the above diets, 2 ml. of blood were taken from the heart of each bird and the blood from each group of birds combined, centrifuged and assayed for antibiotic content. The birds on Diet A were found to have in their blood the antibiotic in the amount of 73% of that found in birds fed diets potentiated by an equivalent amount of terephthalic acid. The birds fed Diet B were found to have in their blood 77% of the antibiotic in the blood of birds fed equivalent amounts of terephthalic acid. The birds fed Diet C were found to have from 93–104% of the antibiotic in their blood as compared to the blood of birds fed with terephthalic acid.

*Example 3*

Five day feeding tests were conducted in the manner described in the preceding example except that in addition to the pentasodium aminotri(methylphosphonate), dodecylbenzene sodium sulphonate (85% active) was added in an equivalent amount. In the blood of birds fed 0.375 mg. per kg. of dodecylbenzene sulfonate and 0.375 mg. per kg. of pentasodium aminotri(methylphosphonate) was potentiated to the extent of 220% as compared to the control of birds fed terephthalic acid. Other groups of birds which were fed 0.5 mg. per kg. of body weight of each component were potentiated to the extent of 330% of the potentiation effect obtained from terephthalic acid.

Although the invention is described with respect to specific embodiments, it is not intended that the details thereof shall be limitations upon the scope of the invention except to the extent incorporated in the following claims.

What is claimed is:

1. A method of augmenting avian blood levels of 5-oxytetracycline which comprises feeding birds one part by weight of 5-oxytetracycline and from about one to about 250 parts by weight of a phosphonate of the class consisting of pentasodium aminotri(methylphosphonate) and n-hexyl aminodi(methylphosphonate).

2. A method of augmenting avian blood levels of 5-oxytetracycline which comprises feeding birds one part by weight of 5-oxytetracycline and from about one to about 250 parts by weight of pentasodium aminotri(methylphosphonate).

3. A method of augmenting avian blood levels of 5-oxytetracycline which comprises feeding birds one part by weight of 5-oxytetracycline and from about one to about 250 parts by weight of n-hexyl aminodi(methylphosphonate).

4. A composition for augmenting avian blood levels of 5-oxytetracycline which comprises one part by weight of 5-oxytetracycline and from about one to about 250 parts by weight of a phosphonate of the class consisting of pentasodium aminotri(methylphosphonate) and n-hexyl aminodi(methylphosphonate).

References Cited by the Examiner

UNITED STATES PATENTS

| | | | |
|---|---|---|---|
| 2,844,466 | 7/1958 | Rogers et al. | 99—2 |
| 2,881,074 | 4/1959 | Harwood | 99—2 |
| 2,899,308 | 8/1959 | Ely et al. | 99—4 |
| 2,907,693 | 10/1959 | Price et al. | 167—65 |
| 2,910,360 | 10/1959 | De Zeeuw et al. | 99—2 |
| 2,963,403 | 12/1960 | Niestand | 167—82 |
| 3,053,892 | 9/1962 | Sieger et al. | 260—559 |
| 3,074,846 | 1/1963 | Nichols | 167—53 |
| 3,085,933 | 4/1963 | Schooley et al. | 167—53 |

OTHER REFERENCES

Chem. Abstracts 54, p. 17926e (1960).
Chem. Abstracts 53, p. 747a (1959).
Chem. Abstracts 51, p. 15978a (1957).
Chem. Abstracts 51, p. 4033b (1957).

LEWIS GOTTS, *Primary Examiner.*